United States Patent
Keefer et al.

[11] Patent Number: 6,056,804
[45] Date of Patent: May 2, 2000

[54] HIGH FREQUENCY ROTARY PRESSURE SWING ADSORPTION APPARATUS

[75] Inventors: Bowie G. Keefer; Christopher R. McLean, both of Vancouver, Canada

[73] Assignee: Questor Industries Inc., Burnaby

[21] Appl. No.: 09/106,124

[22] Filed: Jun. 29, 1998

Related U.S. Application Data

[60] Provisional application No. 60/051,232, Jun. 30, 1997.

[51] Int. Cl.[7] .................................................. B01D 53/047
[52] U.S. Cl. ................................. 95/96; 95/113; 95/130; 96/125; 96/130; 96/144; 96/150; 96/154
[58] Field of Search ............................... 95/96–107, 113, 95/130; 96/121–125, 130, 143, 144, 150, 154

[56] References Cited

U.S. PATENT DOCUMENTS

| | | | |
|---|---|---|---|
| Re. 35,099 | 11/1995 | Hill | 95/98 |
| 3,230,045 | 1/1966 | Miller | 95/96 X |
| 3,236,028 | 2/1966 | Rutan | 95/98 |
| 4,354,859 | 10/1982 | Keller, II et al. | 95/96 |
| 4,406,675 | 9/1983 | Dangieri et al. | 95/26 |
| 4,452,612 | 6/1984 | Mattia | 95/100 |
| 4,576,616 | 3/1986 | Mottram et al. | 95/96 |
| 4,702,903 | 10/1987 | Keefer | 95/96 |
| 4,758,253 | 7/1988 | Davidson et al. | 95/97 |
| 4,787,417 | 11/1988 | Windsor, Jr. | 96/124 X |
| 4,948,401 | 8/1990 | Izumi et al. | 96/130 X |
| 4,968,329 | 11/1990 | Keefer | 95/98 |
| 5,069,688 | 12/1991 | Wells | 95/96 |
| 5,082,473 | 1/1992 | Keefer | 95/98 |
| 5,133,784 | 7/1992 | Boudet et al. | 95/113 |
| 5,166,563 | 11/1992 | Bassine | 95/130 X |
| 5,248,325 | 9/1993 | Kagimoto et al. | 96/124 |
| 5,268,021 | 12/1993 | Hill et al. | 95/98 |
| 5,431,716 | 7/1995 | Ebbeson | 96/125 |
| 5,441,559 | 8/1995 | Petit et al. | 96/125 |
| 5,632,804 | 5/1997 | Schartz | 95/101 |

FOREIGN PATENT DOCUMENTS

| | | | |
|---|---|---|---|
| 0289794 | 9/1988 | Germany | 95/113 |
| 41 02 637 A1 | 6/1991 | Germany . | |
| 6-154537 | 6/1994 | Japan | 95/106 |

OTHER PUBLICATIONS

"Principles of Adsorption and Adsorption Processes", Douglas M. Ruthven, University of New Brunswick, Fredericton, pp. 210–211 (Undated).

*Primary Examiner*—Robert H. Spitzer

[57] ABSTRACT

Pressure swing adsorption separation of a feed gas mixture, to obtain a purified product gas of the less strongly adsorbed fraction of the feed gas mixture, is performed with a cooperating set of "N" adsorbers in a rotary assembly, with each adsorber communicating at its product end directly to a rotary cyclic displacement chamber, and at its feed end by rotary distributor valve ports to a rotary piston feed compressor and a rotary piston exhaust vacuum pump. The compressor and vacuum pump are integrated with the cycle, and rotate at "N" times the cycle frequency. Alternative adsorber configurations for high frequency operation are disclosed.

28 Claims, 12 Drawing Sheets

HIGH FREQUENCY ROTARY PRESSURE SWING ADSORPTION APPARATUS

This application claims the benefit of U.S. Provisional No. 60/051,232 filed Jun. 30, 1997.

TECHNICAL FIELD

The invention relates to gas separations conducted by pressure swing adsorption, and more particularly to oxygen separation from air and to hydrogen purification.

BACKGROUND ART

Gas separation by pressure swing adsorption is achieved by coordinated pressure cycling and flow reversals over an adsorbent bed (or adsorber) which preferentially adsorbs a "heavy" or more readily adsorbed component relative to a "light" or less readily adsorbed component of the mixture. The total pressure is elevated during intervals of flow in a first direction through the adsorber from a first end to a second end of the adsorber, and is reduced during intervals of flow in the reverse direction. As the cycle is repeated, the less readily adsorbed component is concentrated in the first direction, while the more readily adsorbed component is concentrated in the reverse direction.

A light product enriched in the light component is then delivered from the second end of the adsorber, while a heavy product enriched in the heavy component (often a waste stream) is exhausted from the first end of the adsorber. The light product is usually the desired product, and the heavy product often a waste product, as in the important examples of oxygen separation over nitrogen-selective zeolite adsorbents and hydrogen purification. Typically, the feed is admitted to the first end of an adsorber and the light product delivered from the second end of the adsorber when the pressure in that adsorber is relatively elevated, while the heavy product is exhausted from the first end of the adsorber at the low pressure of the cycle.

The conventional process for gas separation by pressure swing adsorption uses two or more adsorbers in parallel, with directional valving at each end of each adsorber to connect the adsorbers in alternating sequence to pressure sources and sinks, thus establishing the changes of working pressure and flow direction. This conventional pressure swing adsorption process also makes inefficient use of applied energy, because of irreversible expansion over the valves while switching the adsorbers between higher and lower pressures.

The prior art also includes the following pressure swing adsorption devices with cyclically operated volume displacement means reciprocating at the same frequency at both ends of an adsorber, to generate pressure changes internally and thus improve energy efficiency.

Keller (U.S. Pat. No. 4,354,859) has disclosed a single adsorber pressure swing adsorption device for purifying both components of a binary gas mixture fed to a central point of the adsorber. This device has volume displacement means which may be pistons or diaphragms, of specified unequal displacements at opposite ends of the adsorber.

In our prior work, Keefer in U.S. Pat. No. 4,702,903 disclosed use of modified Stirling or Ericsson cycle machines for performing gas separations, in which expansion energy of the PSA cycle is recovered and heat may be applied directly through the modified Stirling cycle as a supplemental energy source to perform pressure swing adsorption gas separations. Keefer (U.S. Pat. No. 4,968,329) discloses related PSA gas separation devices with valve logic means to provide large exchanges of fresh feed gas for depleted feed gas. Such large feed exchanges, or effective scavenging, may be required when concentrating one component as a desired product without excessively concentrating or accumulating other components, as in concentrating oxygen from feed air containing water vapour whose excessive concentration and accumulation would deactivate the adsorbent. U.S. Pat. No. 5,082,473 (Keefer) discloses related multistage devices for with extraction and simultaneous concentration of trace components.

An important class of PSA device, as disclosed in the above cited prior patents by Keefer, uses reciprocating pistons communicating with both first and second ends of each adsorber to establish cyclic pressure variations in the adsorber, as well as establishing an oscillating flow pattern in the adsorber of flow in a first direction from first end to second end of the adsorber at the higher pressure, and flow in the reverse direction at the lower pressure. The principle of using positive displacement machinery to generate a high performance PSA cycle is referred to as "Thermally Coupled Pressure Swing Adsorption" or TCPSA, because of the inherent heat pumping aspect resulting from a close mechanical analogy to Stirling or Ericsson cycle thermodynamic engines.

All of the above cited devices use linear reciprocating pistons for establishing the cyclic pressure and reversing flow regime of PSA cycles. With relatively low PSA cycle frequencies attainable with conventional granular adsorbents, the reciprocating machinery is bulky and costly. One approach addressing this problem is use of rigid high surface area adsorbent supports which can overcome the limitations of granular adsorbent and enable much higher cycle frequencies. High surface area laminated sheet adsorbent supports, comprised of stacked or spirally wound adsorbent-impregnated sheet material, are disclosed in Keefer's U.S. Pat. Nos. 4,968,329 and 5,082,473.

Prior art PSA systems with multiport distributor valves have been used commercially in small scale oxygen enrichment applications, as recommended by Dangieri et al (U.S. Pat. No. 4,406,675) for a rapid PSA process in which flow control is intentionally established by relatively steep pressure gradients in the adsorber. The granular adsorber must therefore be spring-loaded or otherwise immobilized to prevent attritional damage.

For large industrial PSA systems, mechanical immobilization of the adsorbers has not been practicable. Careful flow control is required to ensure that pressure gradients in the adsorber are kept low, well below the onset of fluidization.

A further limitation to the use of finely granular adsorbers for PSA and other gas separation processes arises as increasingly smaller particle diameters are considered in order to reduce the macropore diffusion mass transfer resistance as required for higher frequency operation. It is well known (as outlined by D. M. Ruthven in "Principles of Adsorption and Adsorption Processes", Wiley, 1984, pages 210–211) that, owing to a tendency of very small particles to cluster and pack unevenly, "the advantage of reduced pore diffusional resistance which is gained by reduction of particle size can easily be offset by increased axial dispersion" for adsorbers packed of small particles.

As operation of PSA processes at high frequencies requires small particle sizes to reduce the diffusional time constant, while the increased axial dispersion prevents a reduction of adsorber length commensurate with smaller particle diameter, performance tends to degrade with high pressure drop and adsorber attrition problems. Hence, cycle frequencies much above 20 cycles per minute have been impracticable in sustained industrial applications, except by use of laminated sheet adsorbent support as mentioned above.

Mattia (U.S. Pat. No. 4,452,612), Lywood (U.S. Pat. No. 4,758,253), Boudet et al (U.S. Pat. No. 5,133,784), and Petit et al (U.S. Pat. No. 5,441,559) disclose PSA devices using a rotary adsorber configuration. The multiple adsorber ports of an adsorber rotor sweep past fixed ports for feed admission, product delivery and pressure equalization; with the relative rotation of the ports providing the function of a rotary distributor valve. Related devices are disclosed by Kagimoto et al (U.S. Pat. No. 5,248,325). All of these prior art devices use multiple adsorbers in parallel and operating sequentially on the same cycle, with multiport distributor rotary valves for controlling gas flows to, from and between the adsorbers.

An advantage of PSA devices with the adsorbers mounted on a rotary adsorber assembly, as in the cited prior art inventions by Mattia and Boudet et al., is that function port connections for feed, exhaust, product and pressure equalization are made to the stator and are thus accessible to flow control devices.

Within the above prior art, a rotary adsorber assembly may be impracticable for large PSA units, owing to the weight of the rotating assembly. Also, when separating gas components which are highly inflammable or toxic, the rotary adsorber assembly would need to be completely enclosed in a containment shroud to capture any leakage from large diameter rotary seals. Hence, PSA devices with stationary adsorbers have been hitherto preferred for larger scale systems, and for applications processing hazardous gases such as hydrogen.

DISCLOSURE OF INVENTION

The present invention is intended to enable high frequency operation of pressure swing and vacuum swing adsorption processes, with high energy efficiency and with compact equipment of low capital cost. The invention applies most advantageously to relatively low pressure processes conducted near atmospheric pressure, so that fluid sealing may be accomplished primarily by narrow clearances between rotary positive displacement fluid machine components and their housings.

An important aspect of the invention is the application of rotary compression and expansion machinery for TCPSA systems, in which the rotary positive displacement machine revolves at cycle frequency or an integer multiple of cycle frequency. Rotary machines incorporated in alternative embodiments of the present invention include rotary piston pumps, vane pumps, claw pumps, and trochoidal displacement machines. In such machines, gas displacement is achieved directly by rotary actuation of a rotary displacement element. Each of these suitable rotary displacement machines defines a plurality of cyclic displacement chambers operating sequentially or in staggered phase, with each displacement chamber remaining distinct and isolated from other displacement chambers during most of each compression or expansion stroke. By coupling each cyclic displacement chamber with an adsorber, and providing the same number of adsorbers cycling in the same staggered phase as the set of displacement chambers, the TCPSA principle can be extended to make use of rotary machines.

Since rotary displacement machines (compared to reciprocating piston machines) are relatively impracticable at low shaft speed because of volumetric inefficiency due to leakage through clearances or alternatively because of excessive dry friction, the use of rotary displacement machines for TCPSA devices would not be feasible unless operation at relatively high cycle frequency is also feasible.

The apparatus of the present invention includes a rotary adsorber assembly, in which a cooperating set of "N" adsorbers are contained in an adsorber rotor revolving at exactly the cycle frequency. Alternatively, the adsorber rotor may revolve at the cycle frequency divided by an integer "M", in which case the total number of adsorbers in the rotor will be equal to the product M X N. The adsorbers contain adsorbent material, contacting a flow path between first and second ends of the adsorber. The adsorbent material may be granular, but superior performance is achieved when each adsorber is provided as an "adsorbent laminate" element formed from layered adsorbent sheets, the thin adsorbent sheets being the adsorbent material with a reinforcement material, with spacers between the sheets to establish narrow flow channels in a flow direction tangential to the sheets and between adjacent pairs of sheets, with the flow channels together constituting the flow path.

The adsorbers and the adsorber rotor may be configured for radial flow, with the first direction preferably radially inward relative to the axis of rotation. Then the feed gas is preferably admitted to a first end of each adsorber at an outer radius, while the light product gas is delivered from a second end of each adsorber at an inner radius, and the heavy product. is exhausted from the first end of the adsorbers. Alternatively, the adsorbers and the adsorber rotor may be configured for axial flow, with the first direction substantially parallel to the axis of rotation The adsorber rotor rotates within a housing. A fluid sealing surface or valve face defined by an inner wall of the housing is in sealing contact (to within a clearance sufficiently narrow to minimize fluid leakage) to a matching sealing surface or valve face of the rotor. The sealing surface of the rotor has equally spaced ports each communicating to the flow path through an adsorber, at a location in the flow path in the adsorber which may be the first end or the second end of the flow path or a point there between. The valve face (or sealing surface) of the rotor has ports, equally spaced around the rotor, in order to admit feed gas and exhaust second product gas to the first end of the adsorbers in sequence as the rotor rotates. Thus, cooperation between the rotor and the housing provides a distributor valve function for the adsorbers, by opening and closing ports in the valve face to provide fluid communication from displacement chambers to the adsorbers. A light product delivery port is also provided on the housing.

The invention provides an apparatus for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period, the apparatus including a) a number "N" of substantially similar adsorbers of the adsorbent material, with said adsorbers having first and second ends defining a flow path through the adsorbent material, (b) a cyclic rotary displacement means including a displacement chamber and rotary actuation means to cyclically vary the volume of the displacement chamber between minimum and maximum volumes thereof at a displacement cyclic frequency which is an integer multiple "S" of the PSA cycle frequency (c) means to provide fluid communication between the rotary displacement chamber and a location in the flow path through an adsorber while the volume of the displacement chamber is being varied, so as to change the pressure in the adsorber through a pressure interval between the high pressure and the low pressure.

In some embodiments, the displacement cyclic frequency is equal to the PSA cycle frequency, so that "S"=1. The means to provide fluid communication is then simply a conduit, and a rotary displacement chamber is provided for each of the "N" adsorbers whose operation is phased equally about apart in which the rotary displacement chambers are defined by vanes rotating an axis in a substantially cylindrical housing. The rotary actuation means is characterized by continuous rotation at the displacement cyclic frequency. Examples of suitable fluid displacement devices are provided by eccentric vane machines and by trochoidal displacement mechanisms. An alternative embodiment uses a rotary actuation means is characterized by angular oscillation at the displacement cyclic frequency, using semi-rotary oscillating vanes in a circular housing.

Preferred embodiments alternatively or additionally use fluid displacement mechanisms whose displacement cyclic frequency is greater than the PSA cycle frequency by an integer multiple "S">1. The means to provide fluid communication then includes means to sequentially open and close a port to each of the adsorbers in turn during each cycle, so fluid commmunication from the displacement chamber is provided to only one adsorber at a time so as to change the pressure in that adsorber. This valving action is preferably provided by mounting the adsorbers in a rotor with ported sealing faces in the rotor housing to provide a distributor valve function for feed admission to the adsorbers and product removal from the adsorbers. Examples are provided with rotary claw pumps as the fluid displacement mechanism, with "S"=2 or "S" 3.

A further important aspect of the invention makes use of rotary machines for direct actuation of the PSA cycle much more viable. This aspect is to obtain a multiplier of two or three or more, of the rotary machine shaft speed to the PSA cycle frequency. Each rotation of the rotary machine accomplishes a step of the PSA cycle, with the duration of that step being an integral fraction of the PSA cycle period. Hence, the rotary machine can perform the same step for a cooperating set of adsorbers, serving each adsorber in turn through the cycle period. The rotary machine can then revolve more rapidly than the PSA cycle frequency, by a multiplier equal to the number of cooperating adsorbers in that set ("S"="N"), and also equal to the ratio of the cycle period to the sum of the duration of the cycle step served by that machine plus any dwell interval between those steps by the same machine. This principle can be extended to have several rotary machines performing different steps (e.g. feed, exhaust, light reflux expansion, and light reflux recompression) for a cooperating set of adsorbers. Each machine performs the same step for each adsorber in turn, with valving to select each adsorber in turn for the proper step in its PSA cycle.

The present invention displays embodiments in which the rotary machines rotate at two or three times cycle frequency, thus becoming proportionately smaller in displacement. The smaller machines have much lower capital cost, and also much higher efficiency as both volumetric leakage and mechanical friction losses are proportionately smaller.

Claw pumps (also referred to within the art as tooth compressors, or hook and claw compressors or vacuum pumps) are especially important in the present invention. This type of rotary displacement machine (illustrated for example in FIG. 1) has a pair of contrarotating rotors whose claws act as vanes or rotary pistons during each displacement stroke, and then cross-over to prepare for the next stroke. Claw pumps have extremely desirable features of (1) nonlubricated sealing by narrow clearances between mating circular cylindrical faces and no rubbing contact, (2) positive displacement operation, equivalent to a pair of reciprocating cylinders in opposite phase, and (3) a particularly desirable flow waveform.

Over each rotation of a typical claw pump, this flow waveform is characterized by a steady rate of flow displacement (discharge on one side, and intake on the other side) for about 270° of rotation or 75% of the time, and a "dwell interval" of no displacement action during cross-over of the claws over about 90° of rotation or 25% of the time. This flow waveform has been found unexpectedly to be highly desirable for direct integration of claw pumps with a TCPSA cycle, because the dwell interval provides time for opening and closing of valve ports.

Claw pumps are successfully used as the pumping element in several multistage vacuum pumps, and are also used as oil-free compressors. The conventional approach of using the rotor end faces for intake and discharge valve ports results in a severe limitation due to the restricted area of the valve ports relative to rotor diameter, so that at a given rotor speed and diameter the rotor length and displacement must be limited. The present invention overcomes this limitation by using external valves with the claw pump mechanism. As with conventional rotary lobe blowers, rotor length and displacement are then limited only by bearing ratings and by deflections under load. The novel claw pumps of the present invention will thus have a much reduced manufacturing cost, similar to rotary lobe machines which have a similar twin shaft mechanical configuration.

The adsorbers or adsorbers of the present invention are installed in a rotary assembly rotating at cycle frequency. In preferred embodiments, each adsorber communicates at its product end directly to a variable displacement chamber, and at its feed end by rotary distributor valve ports to a rotary piston feed compressor and a rotary piston exhaust vacuum pump. The compressor and vacuum pump are integrated with the cycle, and rotate at "N" times the cycle frequency. Alternative adsorber configurations for high frequency operation are disclosed.

In vacuum swing adsorption cycles for oxygen concentration according to the invention, a cooperating set of adsorbers installed in an adsorber rotor which revolves within a housing having matching valve faces in fluid sealing engagement based on narrow clearances without rubbing contact or alternatively on low friction rubbing seals. The rotor and housing respectively serve as the rotor and stator of a distributor valve operating so that each adsorber is cyclically and sequentially connected at its first end to a feed pump and in the opposite phase to an exhaust pump.

For radial flow, the rotor is preferably configured as a circular right cylinder, whose external cylindrical surface is the valve surface. As the adsorbers are mounted at a finite radius from the axis of revolution, they are subjected to centripetal acceleration.

The angular velocity of the rotor is high enough so that the centripetal acceleration is a large multiple of the earth's acceleration of gravity. Furthermore, the hydrostatic pressure gradient due to centripetal acceleration (outward radial compression stress) within the adsorber is much greater than the maximum inward pressure gradient due to the flow friction of gas flow from the first end to the second end of the adsorbers. The adsorbers are supported at their first end (radially outside) by a first set of screens, and retained against collapsing when the rotor is stopped by a second set of screens at their second end (radially inside).

Hence, the adsorbers are centrifugally clamped on the first screens by centripetal acceleration with the rotor acting as a centrifuge. This centrifugal clamping is much stronger than the ordinary weight of adsorbent in conventional stationary vertical towers, and thus overcomes the limitation of conventional PSA systems to relatively modest upflow gas velocities to avoid incipient fluidization and adsorber movement causing attritional loss and dusting of the adsorbent.

The centrifugal clamping aspect of the present invention allows operation of granular adsorbers with much higher than conventional flow friction pressure gradients while still positively preventing any particle movement and attrition. In turn, this allows use of smaller adsorbent grain sizes, also enabling a very shallow radial adsorber depth. With the small adsorbent granule size reducing the mass transfer diffusional resistance, high PSA cycle frequencies become practicable. Closing the logical argument, high cycle frequencies correspond to the high rotational speed needed for centrifugal clamping.

While the use of rotating granular adsorbers in radial flow configurations is known in the above cited prior art, high frequency operating conditions that would create a useful centripetal acceleration much greater than the acceleration for gravity have not been disclosed. Thus, Boudet et al in U.S. Pat. No. 5,133,784 contemplate a maximum cycle frequency and rotor speed of 20 RPM, which with their mentioned rotor outer radius of 1 meter would provide a maximum centripetal acceleration of approximately 4.4 m/s$^2$ or less than half the acceleration of gravity at the outer radius. The adsorbers at a smaller radius are subject to an even smaller centripetal acceleration.

The centrifugal clamping effect of high centripetal acceleration will improve adsorber packing uniformity with small granular particle sizes, so as to reduce axial dispersion and thus also reduce both the necessary radial adsorber length. With a shorter adsorber length, operating pressure drops due to flow friction are also reduced. Much smaller particle sizes can be used with good performance. In the typical case of macropore diffusional control of mass transfer resistance, the practicable cycle frequency can be increased in approximate inverse proportion to the square of particle diameter being reduced.

In the present invention, the centripetal acceleration at the radius of the adsorbers may be at least 5 times the acceleration of gravity, preferably at least 10 times the acceleration of gravity, and most preferably at least 20 times the acceleration of gravity. Centripetal acceleration at a radial distance from the axis of rotation is defined as the square of rotational angular frequency times that radius.

A further benefit of the invention arises in purification of very low molecular weight gases such as hydrogen and helium to remove higher molecular weight impurities. Here, the light product is separated radially inward, while the heavy impurities are separated radially outward by the centrifugal PSA apparatus of the present invention. In all PSA systems, dispersive effects including axial dispersion, uneven adsorber packing, thermal gradients and wall flow channeling all tend to spread the concentration gradient in the adsorber so as to degrade separation performance. But the strong centripetal acceleration field of the present invention will induce a buoyant stratification of the purified light fraction radially inward of the separated heavy fraction, thus opposing dispersive effects and enhancing separation performance. This important desirable effect is present whether granular adsorbent or laminated sheet supported adsorbent is used, as along as the flow direction in the adsorber is radially inward from the first end to the second end of the adsorber.

The present invention provides the centrifugally clamped and stabilized fine particle granular adsorber (or alternatively laminated sheet adsorbent) to enable a radical advance toward much higher cycle frequency. PSA or TCPSA cycle frequencies in excess of 300 cycles per minute are considered to be practicable within the present invention. Hence the direct actuation of the PSA cycle by rotary displacement machines (operating at an RPM which is either the PSA cycle frequency or a small multiple of PSA cycle frequency) becomes practicable.

MODES FOR CARRYING OUT THE INVENTION

Figure 1:
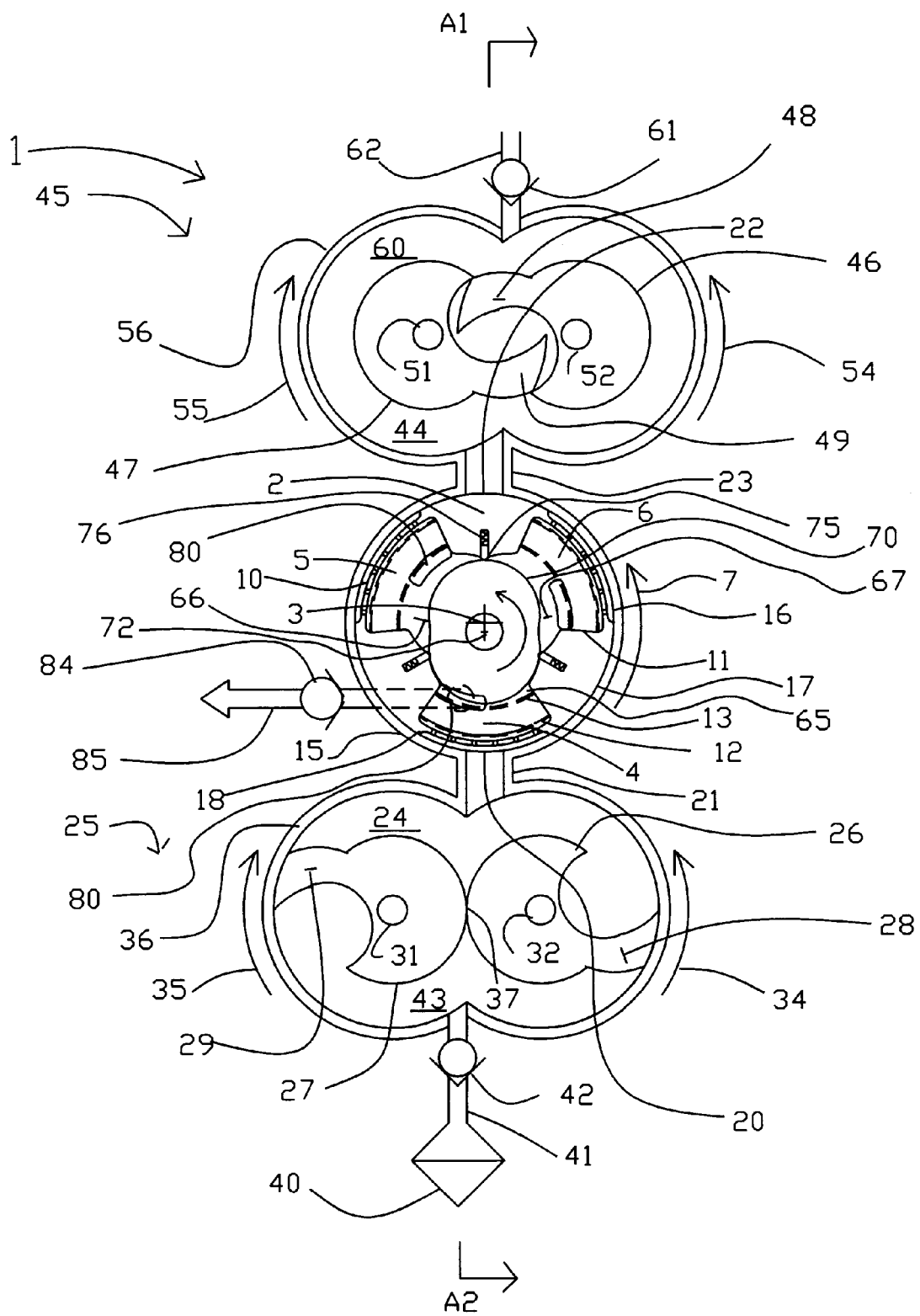
FIGS. 1 and 2 are simplified sectional schematics of an oxygen concentrator apparatus with three adsorbers in a rotor, with claw pumps for compressing feed air and exhausting nitrogen-enriched waste gas, and a trochoidal expansion machine for energy recovery from the oxygen reflux to the adsorbers.
Figure 2:
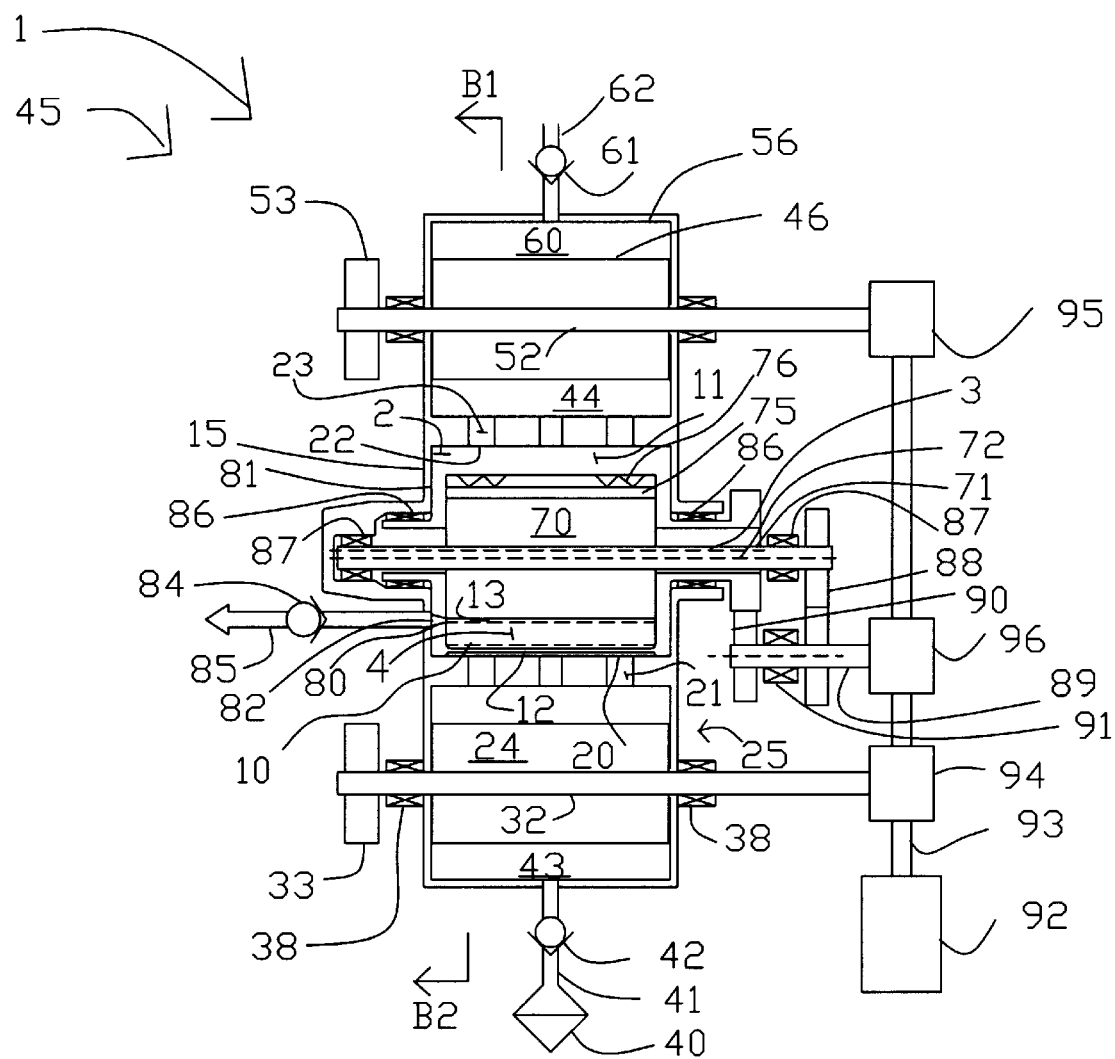

FIGS. 1 and 2

FIG. 1 shows a simplified schematic of a three adsorber PSA oxygen concentrator 1. FIG. 2 is a section of FIG. 1 defined by arrows A1 and A2, while FIG. 1 is a section of FIG. 2 defined by arrows B1 and B2. The apparatus 1 is designed to operate at high cycle frequency, selected in this example as 300 cycles per minute. In this example, "S"="N"=3.

Apparatus 1 has an adsorber rotor 2 revolving about axis 3 at the cycle frequency of 300 RPM. Rotor 2 contains three radial flow adsorbers 4, 5 and 6. The direction of rotation is shown by arrow 7.

Rotor 2 includes a perforated shell 10 radially outward of each adsorber, with shell 10 stiffened by axial buttresses 11 which serve as partitions between each adjacent pair of adsorbers, e.g. adsorbers 4 and 6. Typical adsorber 4 is supported on an outer screen 12, and is retained by an inner screen 13. Outer screen 12 defines a first end of the radial flowadsorber, and inner screen 13 defines a second end of the adsorber. The outer screen must support the adsorber against the strong centrifugal clamping outward forces from centripetal acceleration, while the inner screen serves to retain the adsorbers from collapse when the apparatus rotation is stopped.

Rotor 2 revolves in housing 15 with a close clearance fit between the circular inner wall 16 of housing 15 and sealing lands 17 on buttresses 11. Inner wall 16 defines a valve face or sealing surface 16. The sealing lands between each adjacent pair of adsorbers define a feed plenum for each adsorber (e.g. feed plenum 18 for adsorber 4) while minimizing gas leakage between the feed plenums of adjacent adsorbers. Housing 15 is penetrated by a feed port 20 communicating to feed conduit 21, and by an exhaust port 22 communicating to exhaust conduit 23.

As rotor 2 completes a full revolution, the feed plenum of each adsorber sequentially opens to feed port 20 and exhaust port 22. Hence rotor 2 and housing 15 respectively serve as the rotor and stator of a distributor valve operating so that each adsorber is cyclically and sequentially connected at its first end to the feed conduit and in the opposite phase to the exhaust conduit.

Feed conduit 21 receives compressed feed air from discharge chamber 24 of feed claw pump 25 which operates as a blower. Chamber 24 is a displacement chamber in fluid communication to adsorber 4 to which port 20 is open. Pump 25 has contrarotating rotors 26 and 27 which respectively support claws 28 and 29. The rotors are supported on shafts 31 and 32, maintained in phase relation by timing gears 33 with the direction of rotation indicated by arrows 34 and 35. Claws 28 and 29 maintain a narrow sealing clearance with the inner wall of the pump housing 36, while rotors 26 and 27 are spaced apart by a narrow fluid sealing clearance at point 37 intermediate between their shafts. Shafts 31 and 32 are supported by outboard bearings 38.

Feed air passes through feed filter 40, intake conduit 41 and suction check valve 42 to enter the claw pump intake chamber 43. Discharge check valves may also optionally be placed in conduit 21, which is shown having multiple branches for improved flow distribution in FIG. 2.

Exhaust conduit 23 delivers nitrogen-enriched exhaust air in intake chamber 44 of exhaust claw pump 45 which operates as a vacuum pump. Chamber 44 is a displacement chamber in fluid communication to the adsorbers when port 22 (presently closed) is open. Pump 45 has contrarotating rotors 46 and 47 which respectively support claws 48 and 49, shown intermeshing at the cross-over position during a dwell interval of pump 45. The rotors are supported on shafts 51 and 52, maintained in phase relation by timing gears 53 with the direction of rotation indicated by arrows 54 and 55, and within housing 56. Exhaust gas from discharge chamber 60 is expelled through check valve 61 and discharge conduit 62. During the dwell period, there is fluid communication between chambers 44 and 60, which fluid communication is stopped when the claws sealingly engage the inner wall of housing 56 during the pumping stroke.

Expansion chambers 65, 66 and 67 are provided in rotor 2 for adsorbers 4, 5 and 6 and radially inward of the adsorbers. Each of the expansion chambers(e.g. 65) is a displacement chamber in constant fluid communication to the second end of an adsorber (e.g. 4). Each expansion chamber is defined by the inner screen 13, portions of buttresses 11, and an expander rotor 70. Rotor 70 has a two lobe epitrochoidal form, and rotates on shaft 71 about axis 72 which is displaced from axis 3. Sealing vanes 75 energized by springs 76 within the buttresses 11 also serve to define the expansion chambers by providing fluid sealing against rotor 70.

An oxygen valve port 80 is provided for each expansion chamber 65. The oxygen valve ports 80 penetrate the end wall 81 of rotor 2 which forms a narrow clearance sealing face with housing 15. The valve ports 80 open sequentially to oxygen delivery port 82, which delivers concentrated product oxygen through product check valve 84 to delivery conduit 85 which is maintained at a product delivery pressure slightly less than the higher pressure of the PSA cycle.

It will be seen from FIG. 2 that rotor 2 is supported by outboard bearings 86. Expander rotor shaft 71 is supported by outboard bearings 87, and is coupled by a gear set 88 with a 1:1 ratio to drive shaft 89, in turn coupled by gear set 90 having a 2:3 ratio to the adsorber rotor 2. Drive shaft 89 is supported by fixed bearing 91.

The apparatus 1 is driven by motor 92 with shaft 93, coupled to the feed and exhaust pumps by gearboxes 94 and 95 establishing the same shaft speed for shafts 32 and 52. Shaft 93 is coupled to drive shaft 89 by gearbox 96, with a 4:1 ratio of higher speed for shafts 89 and 71 relative to shafts 32 and 52.

FIG. 3

Figure 3:
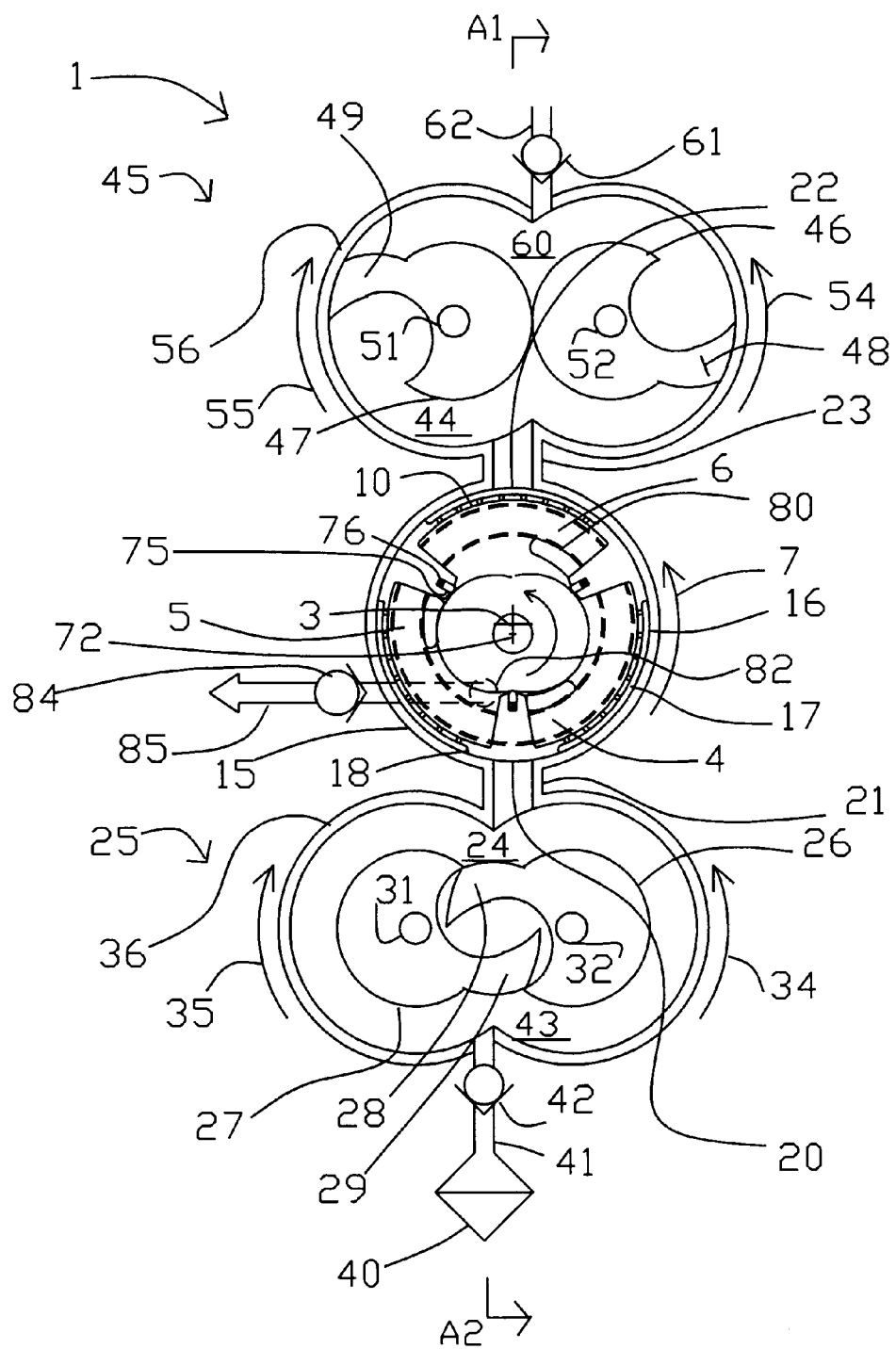
FIG. 3 shows the apparatus of FIG. 1 after rotating through ⅙ of the cycle period from the position of FIG. 1.

FIG. 3 shows the apparatus of FIG. 1 after rotating through ⅙ of the cycle period from the position of FIG. 1.

In the position of FIG. 1, adsorber 4 is being pressurized by feed gas being delivered from feed pump chamber 23, and is beginning to deliver product oxygen. Absorber 5 is under product repressurization by the expander rotor, while adsorber 6 is being depressurized by the expander rotor.

In the position of FIG. 2, adsorber 4 is being depressurized by the expander rotor, adsorber 5 is completing product repressurization by the expander rotor, and adsorber 6 is being further depressurized by the exhaust pump.

It should be noted that for oxygen generation applications the displacement of the exhaust (vacuum) pump 45 will be significantly larger than the displacement of the feed (blower) pump 25, because the heavy product is about 90% of the feed molar flow while being handled at lower pressure.

It is also commented that instead of having a single claw on each rotor, some claw pumps have a pair of claws spaced 180° apart on each rotor so that their rotational speed must be halved for the same number of pumping strokes per unit time.

FIG. 4

Figure 4:
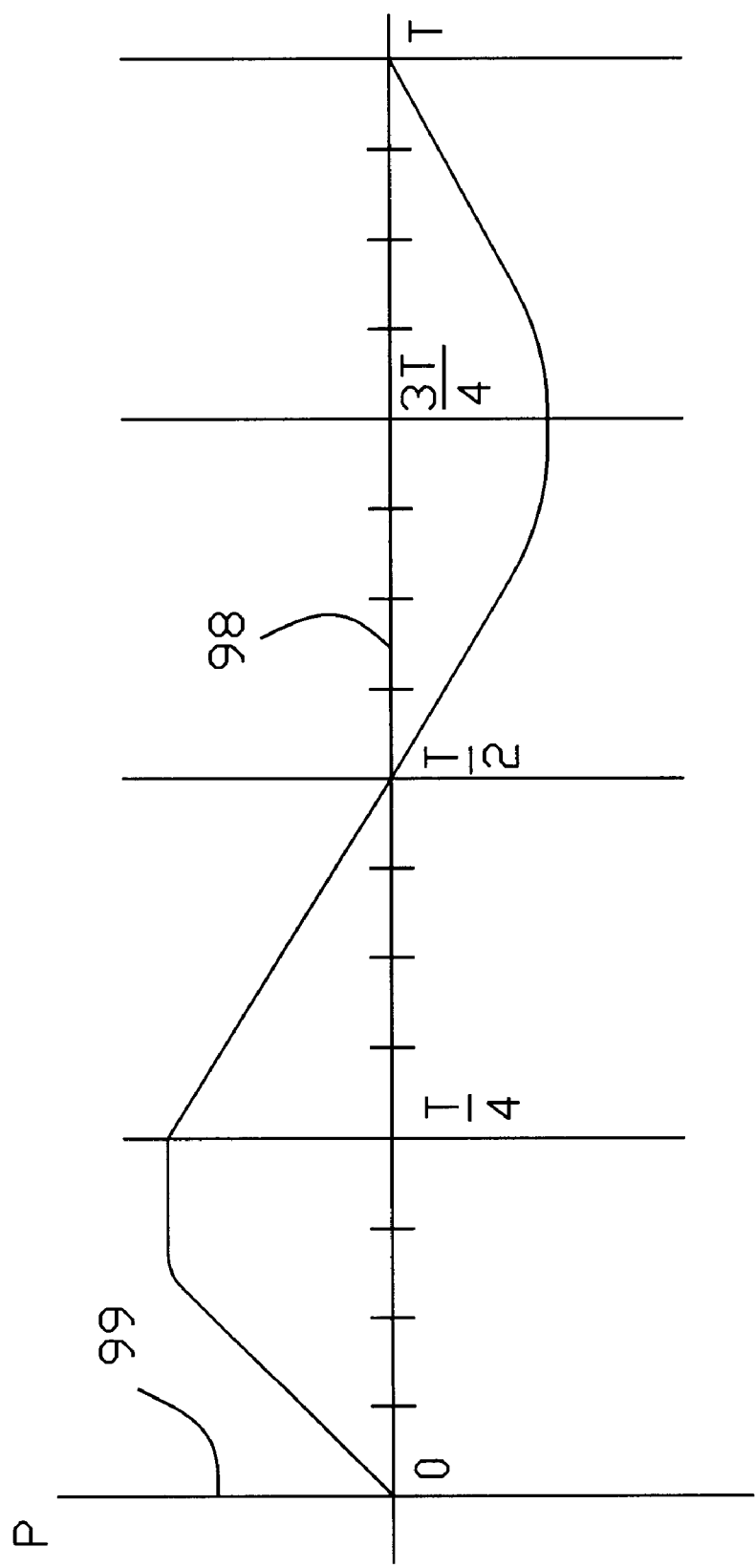
FIG. 4 shows the variation over a complete cycle period of pressure in one of the adsorbers of the FIG. 1 apparatus.

FIG. 4 shows the variation over a complete cycle period of pressure in one of the adsorbers of the FIG. 1 apparatus. Horizontal axis 98 represents time over a complete cycle period "T", while the vertical axis 99 denotes nominal working pressure in one of the adsorbers.

Between times 0 and T/4, the feed pump is delivering feed air to the adsorber to raise the pressure and finally deliver purified light product oxygen at the higher pressure of the cycle. Between times T/2 and 3T/4, the exhaust pump is removing nitrogen-enriched heavy product under moderate vacuum.

From time T/4 to T/2, pressure reduction is achieved solely by expansion (recovering energy) by action of the expander rotor. From time 3T/4 to T, initial repressurization is achieved solely by action of the expander rotor.

It will be noted that the intervals devoted to feed supply and exhaust removal are each 90° of the 360° period. Since the pumping stroke of the claw pumps is about 75% of each pump rotation and the stroke here takes 90° of the PSA cycle phase, the dwell interval is about 30° of the PSA cycle phase so that each rotation of the claw pump corresponds to 120° of PSA cycle phase or one third of the PSA cycle period. Hence, each claw pump can in this cycle support 3 adsorbers perfectly.

Figure 5:
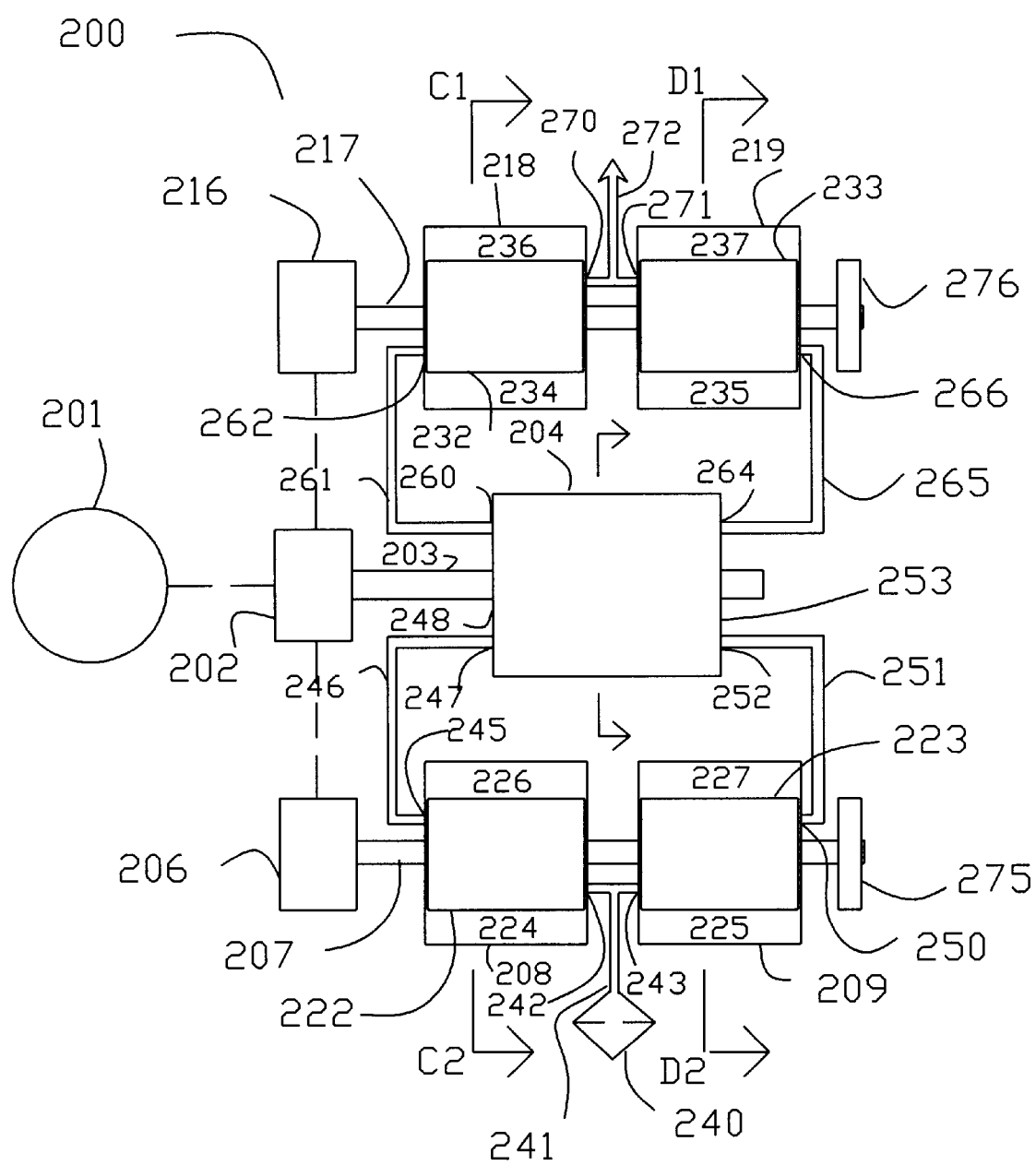
FIG. 5 shows an alternative six adsorber embodiment for concentration of oxygen.
Figure 6:
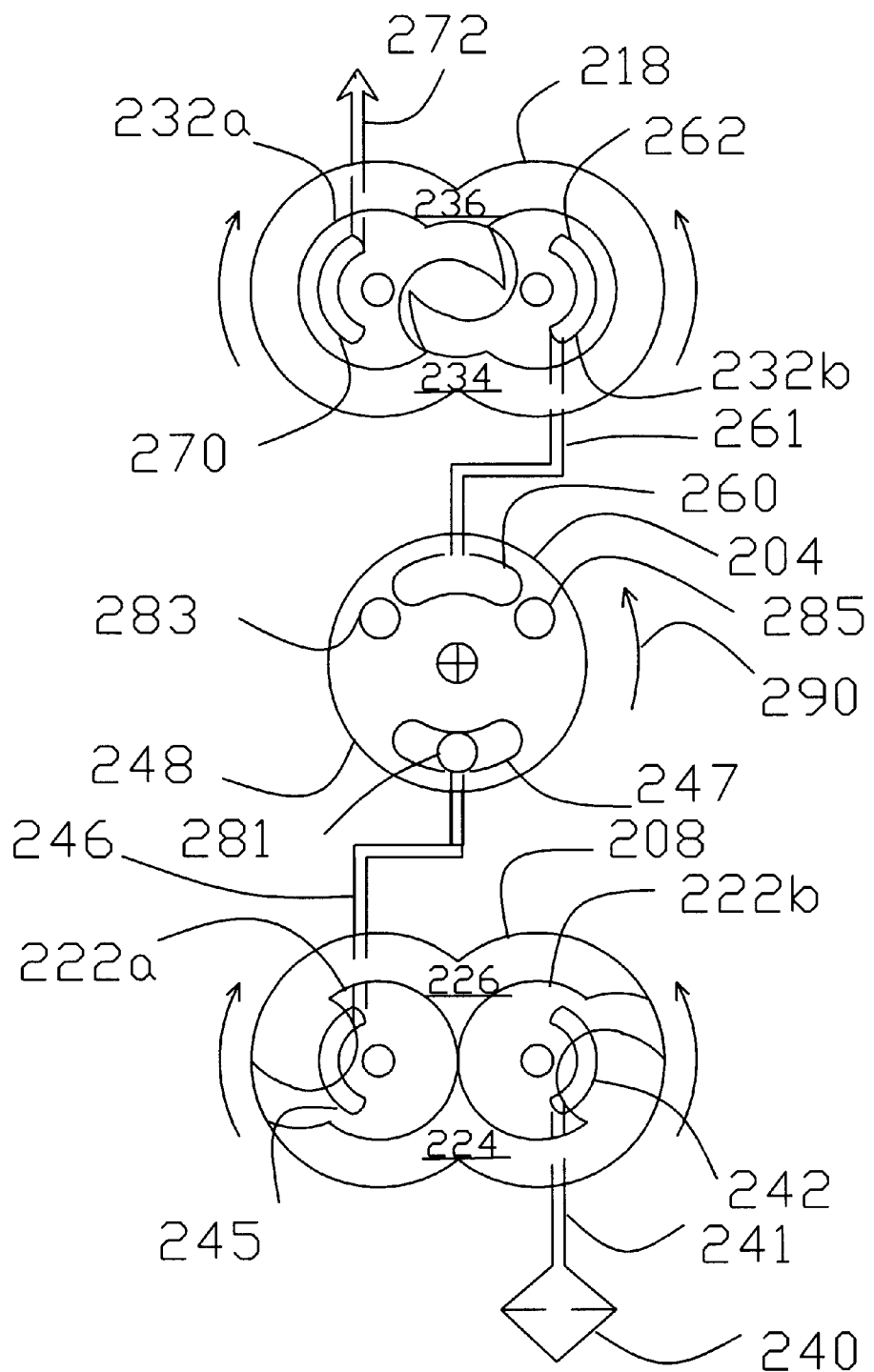
FIGS. 6 and 7 are sections of FIG. 5, each with feed and exhaust claw pumps serving three of the six adsorbers.
Figure 7:
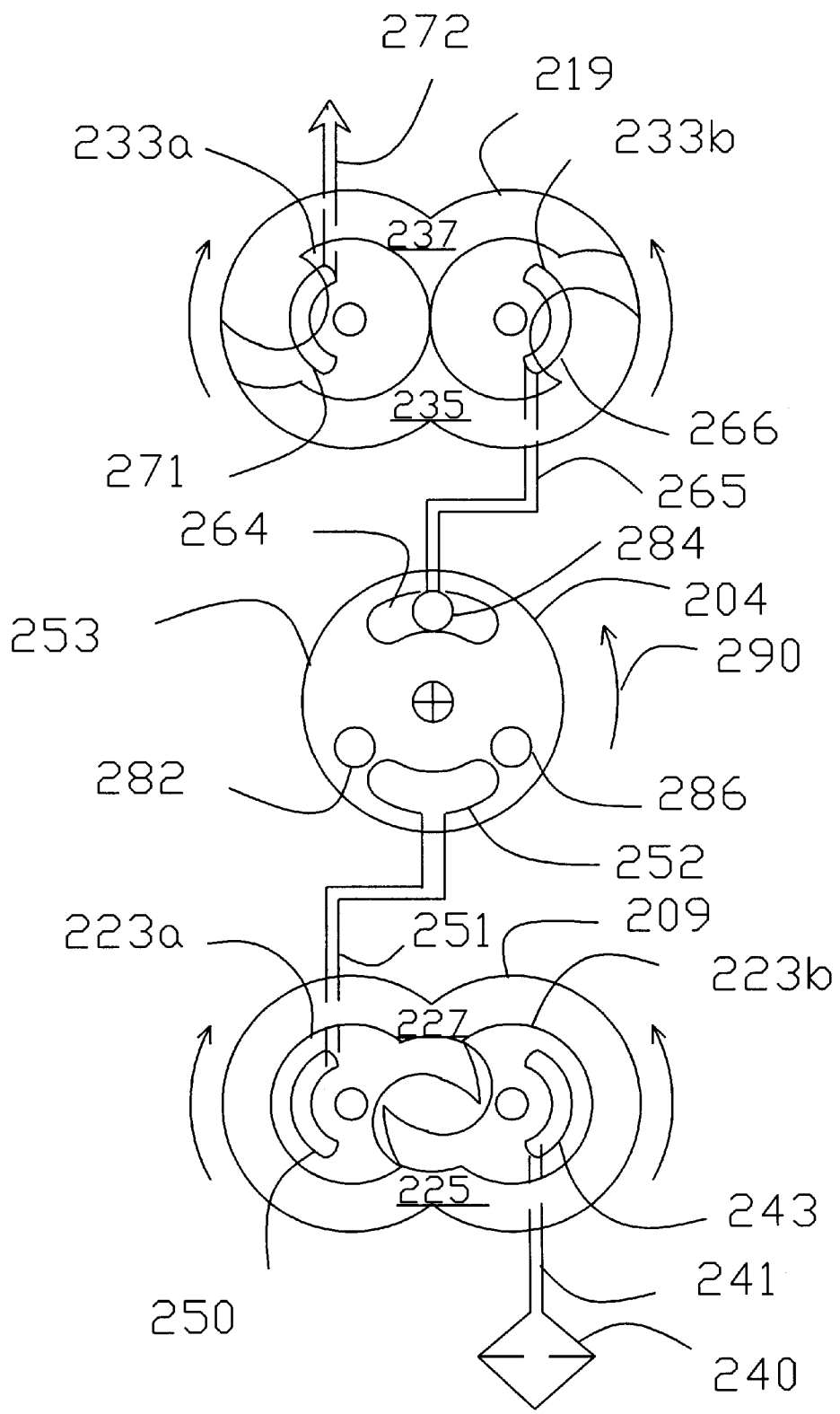

FIGS. 5, 6 and 7

FIG. 5 shows an alternative six adsorber embodiment 200 for concentration of oxygen, based on a pressure waveform for each adsorber similar to that of FIG. 4. FIGS. 6 and 7 are respectively sections defined by arrows C1 and C2, and arrows D1 and D2, of FIG. 5, each with feed and exhaust claw pumps serving three of the six adsorbers.

Two sets of three adsorbers are operated with a claw feed pump and exhaust pump for each set of three adsorbers, with the pumps of the two sets of adsorbers being operated in staggered phase so that the total 6 adsorbers operate in the same PSA cycle but phased 60° apart.

Apparatus 200 is driven by motor 201, mechanically coupled by gearbox 202 and shaft 203 to adsorber rotor 204, by gearbox 206 and shaft 207 to feed pumps 208 and 209 in tandem, and by gearbox 216 and shaft 217 to exhaust feed pumps 218 and 219 in tandem. As with embodiment 1, gearbox ratios are selected so that the feed and exhaust pumps rotate at three times the rotational speed of the adsorber rotor.

Feed pumps 208 and 209 have rotors 222 and 223 defining intake chambers 224 and 225 and discharge chambers 226 and 227 respectively. Exhaust pumps 218 and 219 have rotors 232 and 233 defining intake chambers 234 and 235 and discharge chambers 236 and 237 respectively.

The unconventional claw pumps of embodiment 1 use external valves. However the claw pumps in embodiment 200 are more conventional in having inlet and outlet ports in their housing end plates, opened and closed by the rotor claws.

Feed air is introduced by intake filter 240 and infeed conduit 241 to feed pump intake ports 242 and 243, cyclically opened by rotors 222b and 223b to intake chambers 224 and 225. Compressed air from discharge chamber 226 is conveyed by opening of port 245 by rotor 222a to conduit 246 and feed valve port 247 in valve face 248 on adsorber rotor 2. Compressed feed air from discharge chamber 227 is conveyed by opening of port 250 by rotor 223a to conduit 251 and feed valve port 252 in valve face 253 on adsorber rotor 2. Second product (nitrogen-enriched) leaves valve face 248 by exhaust valve port 260, and via conduit 261 enters intake chamber 234 by exhaust pump intake port 262 when opened by rotor 232b. Second product leaves valve face 253 by exhaust valve port 264, and via conduit 265 enters intake chamber 235 by exhaust pump intake port 266 when opened by rotor 233b. Exhaust gas is compressed to atmospheric pressure in discharge chambers 236 and 237, and is discharged respectively by discharge port 270 when opened by rotor 232a, and by discharge port 271 when opened by rotor 233a, to discharge conduit 272.

Timing gears 275 synchronize rotors 222a and 223a with rotors 222b and 223b, and timing gears 276 synchronize rotors 232a and 233a with rotors 232b and 233b. Rotors 222a, 222b, 233a and 233b are in phase with each other, and in opposite phase to rotors 232a, 232b, 223a and 223b.

Adsorber valve ports 281, 282, 283, 284, 285 and 286 for the first ends of the six adsorbers in the adsorber rotor 204 are in sequence phased 60° apart. Ports 281, 283 and 285 are in valve face 248, while ports 282, 284 and 286 are in valve face 253. At the instant depicted, adsorber valve port 281 is receiving compressed feed gas from feed pump 208, while adsorber valve port 284 is discharging exhaust gas to exhaust pump 219. By the direction of rotation indicated by arrow 290, adsorber valve ports 282 and 283 must be depressurizing, while adsorber valve ports 285 and 286 must be repressurizing.

FIG. 8

Figure 8:
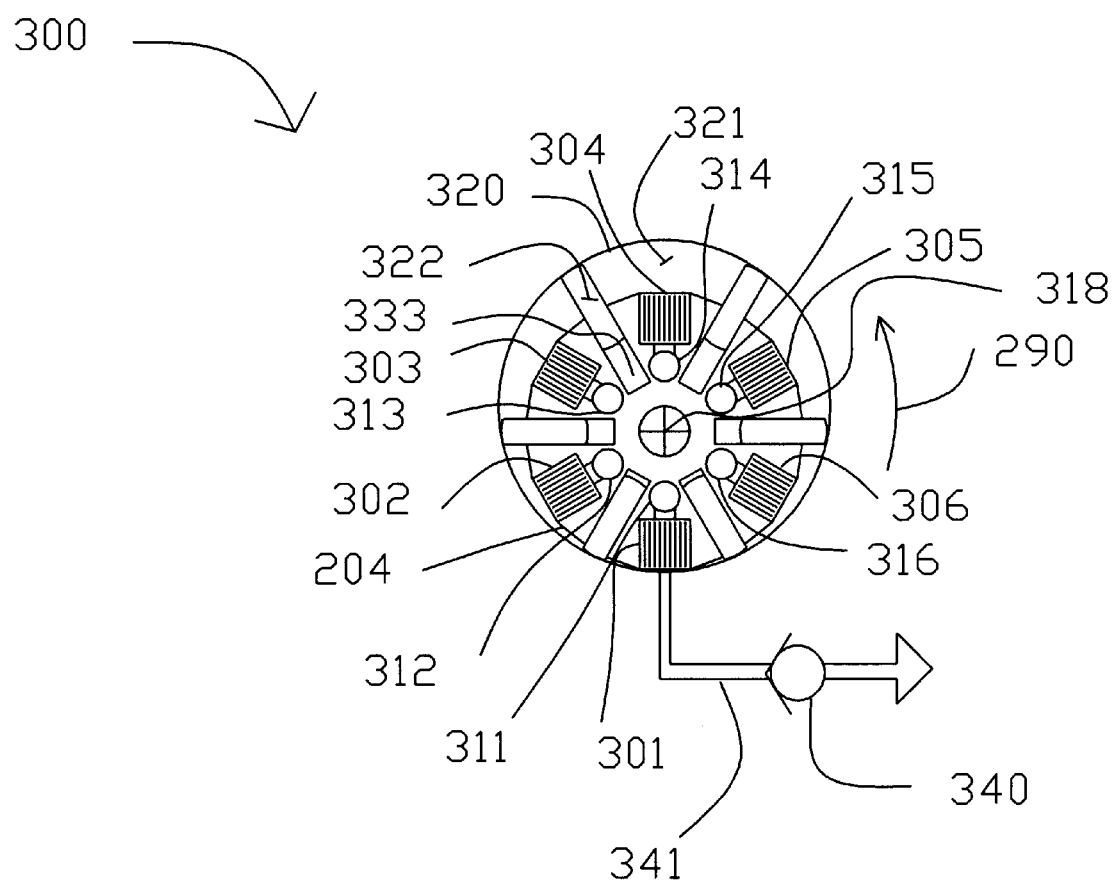
FIG. 8 shows a rotary vane oxygen expander for the FIG. 5 embodiment.

FIG. 8 shows a rotary vane oxygen expander for the FIG. 5 embodiment, as the section of adsorber rotor 204 defined by arrows E1 and E2.

In this embodiment 300 of adsorber rotor 204, the rotor contains six adsorbers 301, 302, 303, 304, 305 and 306 communicating respectively by first end manifolds 311, 312, 313, 314, 315 and 316 to adsorber valve ports 281, 282, 283, 284, 285 and 286. Reversing the normally preferred configuration of adsorber first end (feed) radially outward and second end (light product) radially inward, the first ends are here closer to the axis of rotation 318.

Axis 318 is eccentric to circular cylindrical housing 320. The space between the rotor 204 and the inner wall of housing 320 is compartmentalized into six expansion chambers 321 by six vanes 322. Each expansion chamber is a displacement chamber in constant fluid communication with the second end of one of the adsorbers (e.g. 304). The vanes 322 are free to move radially in grooves 333, and may be urged into fluid sealing contact with the inner wall of housing 320 by springs as well as centripetal acceleration of rotation.

The light product oxygen is withdrawn from typically the expansion chamber at highest pressure by light product delivery check valve 340 and conduit 341.

FIG. 9

Figure 9:
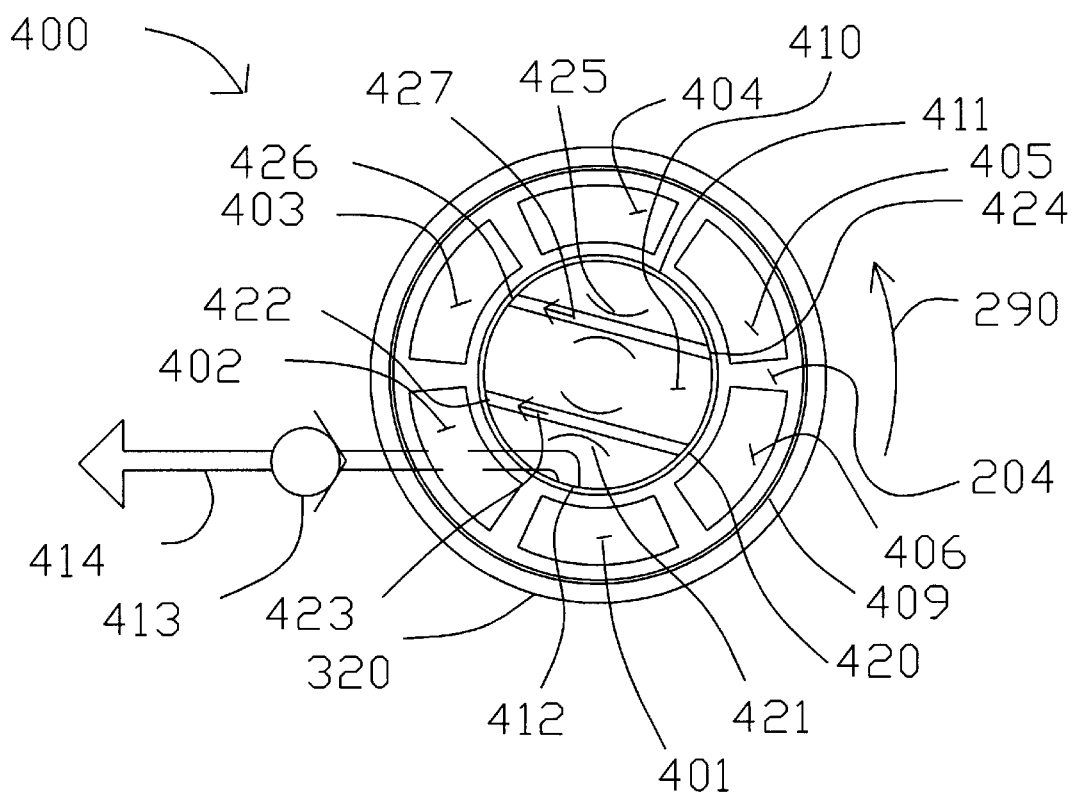
FIG. 9 shows the alternative use of a rotary multiport valve with throttle orifices for light reflux steps.

FIG. 9 shows the alternative use of a rotary multiport valve with throttle orifices for light reflux steps. In this embodiment 400 of rotor 204, the rotor is configured as an annulus containing six adsorbers 401, 402, 403, 404, 405 and 406. Reversing the arrangement of embodiment 300, the first ends of the adsorbers are radially outward and the second ends are radially inward. This embodiment has no light reflux (oxygen) expander, but instead uses a multiport valve to direct light reflux flow through orifices for equalization, cocurrent blowdown and purge steps.

Rotor 204 revolves within housing 320 with a narrow clearance 409 providing fluid sealing and valve porting for admission of feed and exhaust of second product (nitrogen waste), as set forth in discussion of FIGS. 5, 6 and 7. A stationary light reflux valve pintle 410, sealing to the inner wall of annular rotor 204 by a narrow clearance and sealing face 411. Sealing face 411 is depicted with a product delivery valve port 412, presently open to the second end of adsorber 401 (also receiving compressed feed from feed pump 208) to receive purified oxygen for delivery by check valve 413 and conduit 414.

Pintle 410 also has a first cocurrent blowdown port 420, communicating by equalization conduit and orifice 421 within pintle 410 to repressurization port 422, with the direction of flow indicated by arrow 423. Second cocurrrent blowdown port 424 communicates by purge conduit and orifice 425 within pintle 410 to port 426, with the direction of flow indicated by arrow 427.

FIG. 10

Figure 10:
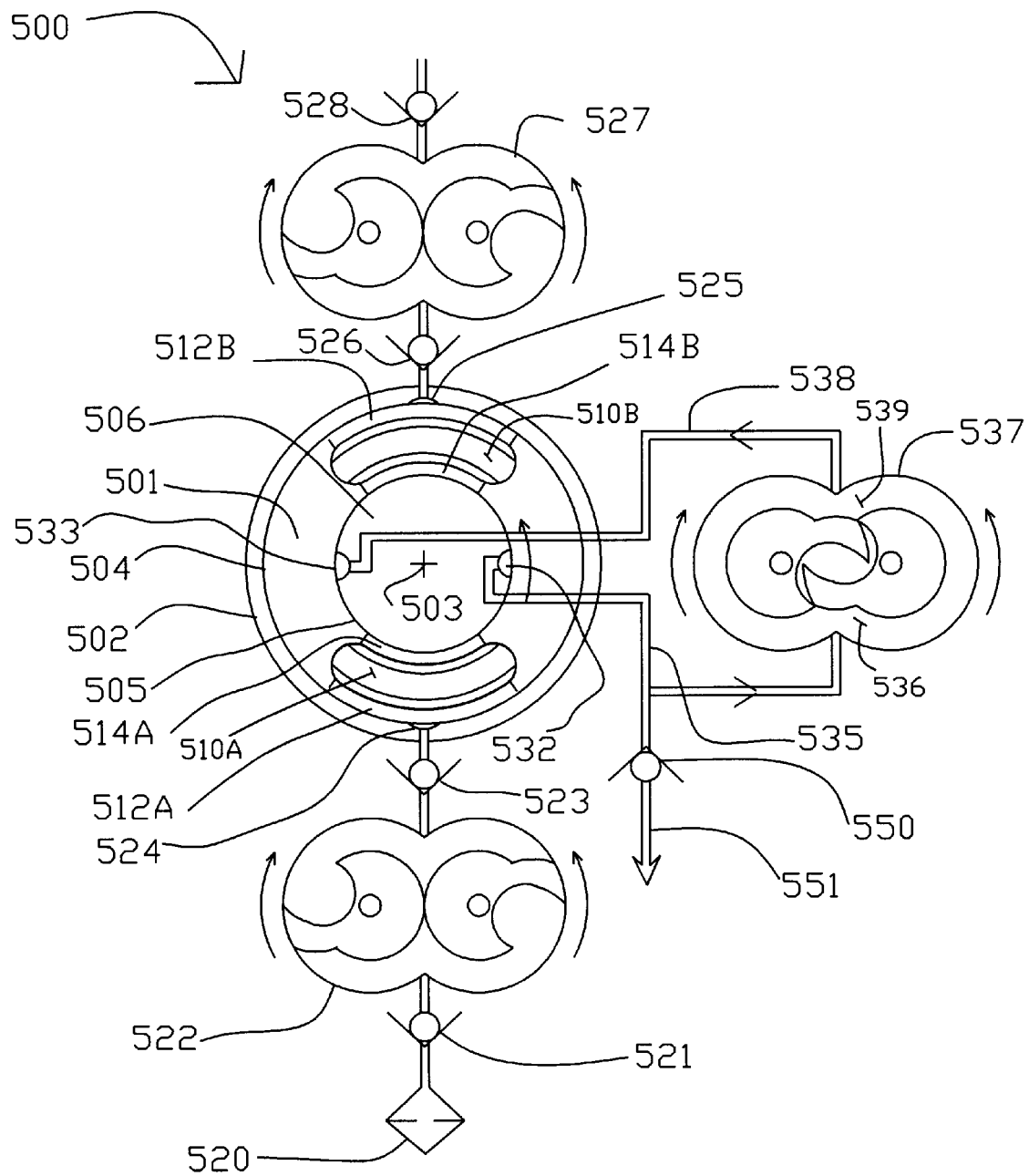
FIG. 10 shows an alternative embodiment using a claw pump for oxygen reflux energy recovery.

FIG. 10 shows an alternative embodiment 500 using a claw pump for oxygen reflux energy recovery, and with only two adsorbers in the adsorber rotor. Here, "S"="N"=2.

Adsorber rotor 501 revolves counterclockwise in housing. 502 about axis 503. Rotor 501 is formed as a cylindrical annulus with concentrically a first sealing surface 504 defined by the outer radius of cylindrical rotor 501, and a second sealing surface 505 defined by an inner radius of rotor 501. A narrow clearance establishes fluid sealing between housing 502 and rotor 501 in sealing surface 504. A stationary pintle 506 is provided within rotor 502, in fluid sealing relationship to the second sealing surface 505 established by a narrow clearance between the pintle and the rotor at sealing surface 505. The rotor contains adsorbers 510A and 510B, radially opposed so that they will operate in opposite phase. Adsorbers 510A and 510B have first ends radially outward, communicating respectively with first plenums 512A and 512B, open to the first sealing surface 504. Adsorbers 510A and 510B have second ends radially inward communicating respectively with second plenums 514A and 514B, open to the second sealing surface 505.

Feed air from inlet filter 520 and suction check valve 521 is compressed by feed claw pump 522 and delivered through delivery check valve 523 to feed port 524 open to first sealing surface 504 through housing 502. In the position of the rotor shown in FIG. 10, feed port 524 is open to first plenum 512A and thence to adsorber A. Nitrogen-enriched exhaust air (second product gas) is simultaneously withdrawn through exhaust port 525 and inlet check valve 526 by exhaust pump 527, discharging through discharge check valve 528. Exhaust port 525 is 180° phased from feed port 524, so that exhaust port 525 is open to first plenum 512B and thence adsorber SLOB when feed port 524 is open to adsorber 510A.

A light reflux exit port 532 and a light reflux return port 533 are provided to communicate from pintle 506 to second sealing surface 505. Ports 532 and 533 are both closed in the rotor position shown in FIG. 10. Ports 532 and 533 are respectively phased approximately 90° after feed port 524 and exhaust port 525, so that the second plenum 514A of adsorber 510A will next open to light reflux exit port 532, and the second plenum 514B of adsorber 510B will next open to light reflux return port 533 as the rotor turns past the position shown in FIG. 10. Exit port 532 communicates by conduit 535 to intake chamber 536 of oxygen expander 537. Return port 533 communicates by conduit 538 to discharge chamber 539 of oxygen expander 537. Oxygen expander 537 uses the claw pump mechanism. Product oxygen is withdrawn from conduit 535 by check valve 550 and product delivery conduit 551.

FIG. 11

Figure 11:
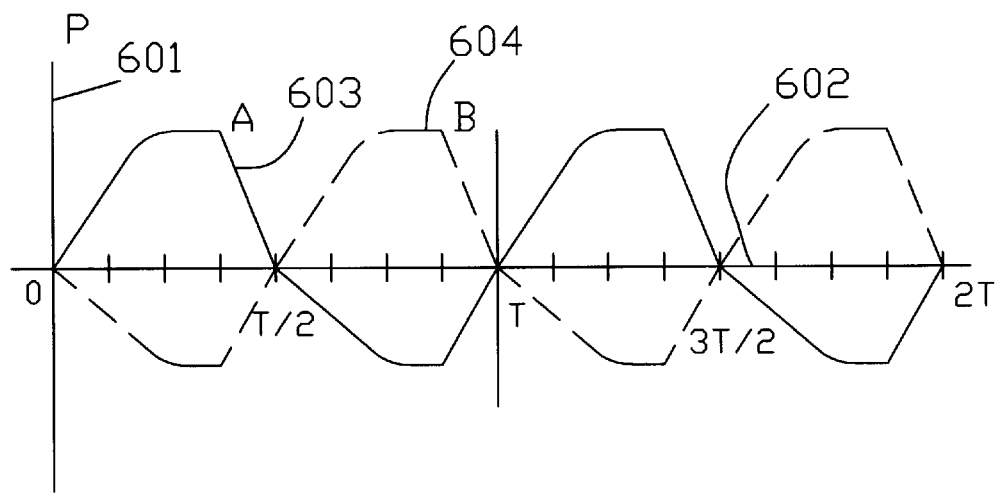
FIG. 11 shows the PSA cycle for the apparatus of FIG. 10.

FIG. 11 shows the PSA cycle for the apparatus of FIG. 10. Vertical axis 601 indicates pressure, and horizontal axis 602 indicates time from 0 to 2T where "T" is the PSA cycle period. Curves 603 and 604 respectively show the pressure in adsorbers 510A and 510B. The instant of time in FIG. 10 is approximately T/4.

Intervals of displacement strokes (separated by claw pump cross-over dwell intervals) for adsorbers A and B are shown as rectangular bars in row 611 for the feed pump 522, in row 612 for the exhaust pump 527, in row 613 for intake of light reflux oxygen into the oxygen expander 537, and in row 614 for discharge of light reflux oxygen into the oxygen expander 537. Dwell intervals separate the horizontal bars, which are to be referred to axis 602 for the time scale.

FIG. 12

Figure 12:
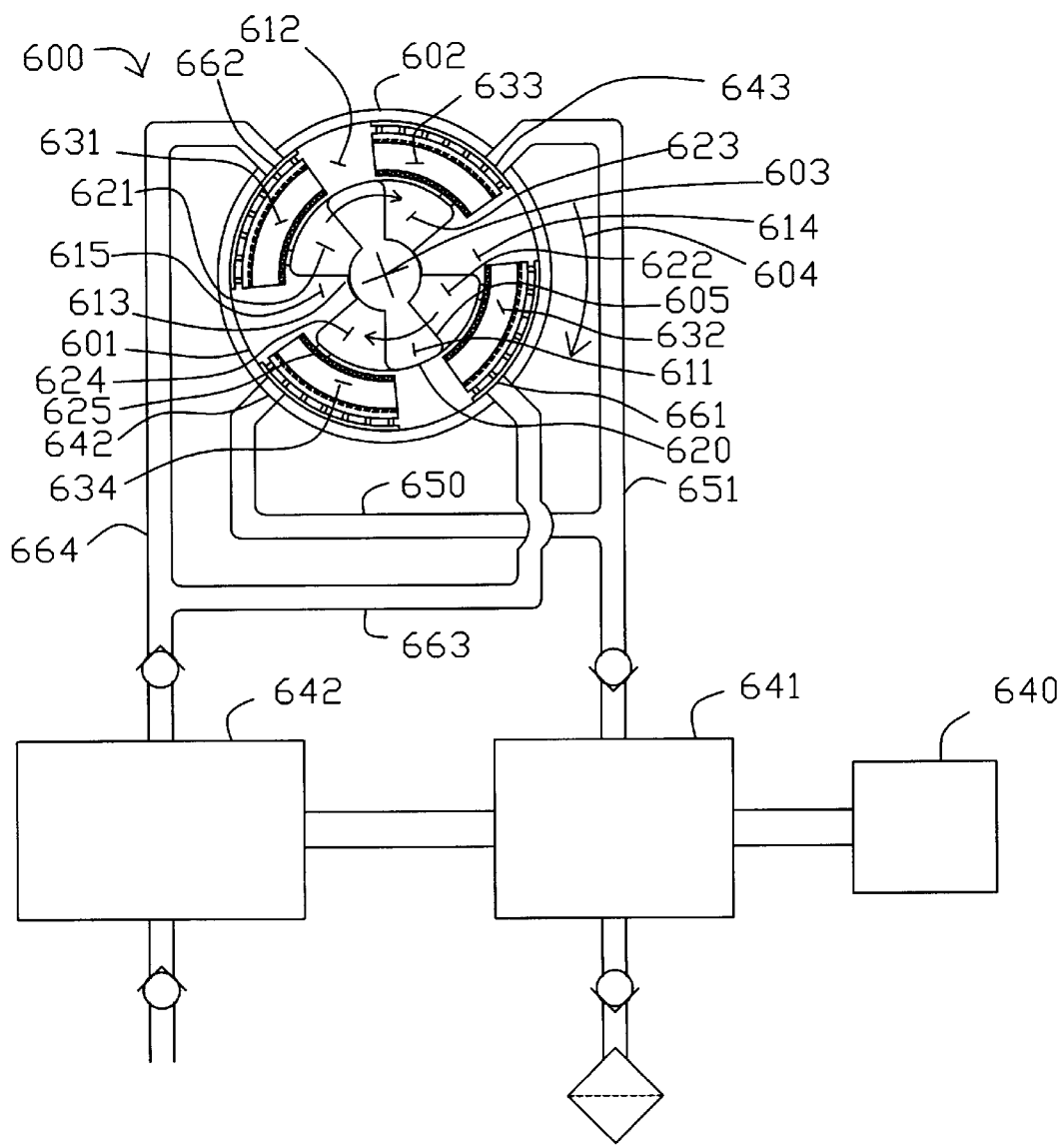
FIG. 12 shows an embodiment with expansion chambers defined by an angularly oscillating rotary vane mechanism.

FIG. 12 shows another embodiment 600, using an oscillating rotary vane displacement mechanism for the light reflux expander.

Adsorber rotor 601 revolves within housing 602 and around axis 603 at a steady angular velocity as indicated by arrow 604. An oscillating vane rotor 605 also rotates about axis 603, at the same average angular velocity as adsorber rotor 601. The angular velocity of rotor 601 is one half of the PSA cycle frequency, and the angular oscillations of vane rotor 605 (relative to its average angular velocity) are at exactly the PSA cycle frequency. Vane rotor 605 has vanes 611 and 612 on opposite sides of hub 613, and oscillates between diametrically opposed abutments 614 and 615 protruding radially inwardly from rotor 602 in fluid sealing engagement by narrow clearance with hub 613. Vanes 611 and 612 are likewise in fluid sealing engagement by narrow clearance with inner wall 620 of rotor 601.

Expansion chambers are defined between the vanes and the abutments, so that expansion chamber 621 is defined between vane 612 and abutment 615, expansion chamber 622 is defined between vane 611 and abutment 614, expansion chamber 623 is defined between vane 612 and abutment 614, and expansion chamber 624 is defined between vane 611 and abutment 615. Chambers 621 and 622 are in phase with each other, and in opposite phase with chambers 623 and 624. Expansion chambers 621, 622, 623 and 624 respectively communicate by ports 625 to the second ends of adsorbers 631, 632 and 634.

The apparatus includes motor 640 driving a feed pump 641 and an exhaust pump 642, preferably of the claw pump principle. Compressed feed gas from feed pump 641 is conveyed by conduits 650 and 651 to diametrically opposite valve ports 642 and 643, respectively open at the instant shown to the feed plenums and first ends of adsorbers 634 and 633 whose PSA cycles are in phase.

Exhaust gas is simultaneously withdrawn under vacuum from the first ends and feed plenums of adsorbers 631 and 632 whose PSA cycles are in phase with each other but in opposite phase to adsorbers 633 and 634. The exhaust is withdrawn through valve ports 661 and 662, respectively communicating by conduits 663 and 664 to the inlet of exhaust pump 642.

The stroke rate (and shaft speed for claw pumps as described above) of pumps 641 and 642 is twice the cycle frequency, while the angular velocity of rotor adsorber rotor 601 is half the cycle frequency. The oscillation of vane rotor 605 (at cycle frequency) relative to rotor 601 may be established by a cascaded set of noncircular gears, or alternatively by an electric stepper motor drive. Adsorber rotor 601 and vane rotor 605 have the same average angular velocity.

The amplitude of oscillation is defined by the angular width of the vanes and the abutments. Phase of oscillation must be coordinated with the spacing of the valve ports in housing 602, and the rotary phase of the feed and exhaust claw pumps.

Oscillation of vane rotor 605 will in fact be a power source by virtue of net energy recovery from gas expansion exceeding energy consumption for gas compression in the expansion chambers. The instantaneous power for oscillation of rotary piston 605 will be minimized by operating at a cycle frequency approaching the resonant frequency defined by the gas spring characteristics of the apparatus coupled to the expansion chambers, and the polar moment of inertia of rotary piston 605 about axis 603.

More generally, net recovery of expansion energy will be achieved in expansion chambers 65, 66 and 67 in embodiment 1 of FIG. 1, expansion chamber 321 in embodiment 300 of FIG. 8, and expansion claw pump 537 in embodiment 500 of FIG. 10. In each case, this recovery of expansion energy will provide a cooling effect beneficial to adsorbent selectivity and performance.

As depicted for embodiment 1 in FIG. 2, auxiliary light product valve ports (not shown in FIG. 12) will be provided in an end face of housing 602 to deliver purified oxygen from the expansion chambers at the highest pressure interval of the PSA cycle for each adsorber.

INDUSTRIAL APPLICABILITY

At the present stage of development, successful operation of adsorbent laminate modules has been achieved in experimental PSA units generating high purity oxygen up to 100 cycles/minute. With thinner adsorbent laminate sheets and close control of flow channel accuracy, this adsorbent technology will by useful at cycle frequencies in excess of at least 300 cycles/minute.

Because the present invention enables very high PSA cycling rates, it will achieve radical miniaturization of the equipment. Hence, very high energy efficiency will be achieved in much more compact equipment.

Ultracompact and energy-efficient PSA equipment may be useful for oxygen enrichment and hydrogen purification in advanced energy generation systems such as fuel cells.

The high frequency PSA systems of the present invention achieve superior control characteristics. These systems feature partly or fully self-regulated cycle control, and enable high recovery because of optimally stratified light reflux. Energy efficiency is enhanced by recovery of expansion energy, and because the feed compression and vacuum pump functions ride the working pressure in the adsorbers, on average much less than maximum positive or vacuum pressures in the processs. Low pressure ratios above and below atmospheric pressure reduce adiabatic departures from ideal isothermal processes.

We claim:

1. Process for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period; providing for the process a number "N" of substantially similar adsorbers of the adsorbent material, and also providing a cyclic rotary displacement means including a displacement chamber; and cyclically varying the volume of the displacement chamber between minimum and maximum volumes thereof at a displacement cyclic frequency which is an integer multiple "S" of the PSA cycle frequency, and providing fluid communication between the displacement chamber and the adsorber so as to change the pressure in the adsorber through a pressure interval between the high pressure and the low pressure.

2. Process for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material in a flow path is relatively enriched in the first component at a lower pressure and is relatively enriched in the second component at a higher pressure when the pressure is cycled between the lower and higher pressures at a cyclic frequency of the process defining a cycle period; providing for the process a number "N" of substantially similar adsorbers of the adsorbent material in an adsorber rotor having an axis of rotation, with the flow path in each adsorber oriented substantially radially to the axis; and rotating the rotor at a high angular frequency so as to establish a centripetal acceleration field over the adsorbers at least 5 times greater than gravitational acceleration.

3. The process of claim 2, in which the first component has a higher molecular weight than the second component, and further admitting the feed gas mixture to a first end of the adsorbers and delivering a purified light product of the second component depleted in the first component from a second end of the adsorbers, such that the second end is radially outward of the first end with reference to the axis of rotation.

4. Apparatus for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period, the apparatus including (a) a number "N" of substantially similar adsorbers of the adsorbent material, with said adsorbers having first and second ends defining a flow path through the adsorbent material, (b) a cyclic rotary displacement means including a displacement chamber and rotary actuation means to cyclically vary the volume of the displacement chamber between minimum and maximum volumes thereof at a displacement cyclic frequency which is an integer multiple "S" of the PSA cycle frequency, (c) means to provide fluid communication between the rotary displacement chamber and a location in the flow path through an adsorber while the volume of the displacement chamber is being varied, so as to change the pressure in the adsorber through a pressure interval between the high pressure and the low pressure.

5. The apparatus of claim 1, in which the displacement cyclic frequency is equal to the PSA cycle frequency, so that "S"=1.

6. The apparatus of claim 5, in which the means to provide fluid communication is a conduit, and a similar rotary displacement chamber is provided for each of the "N" adsorbers.

7. The apparatus of claim 6, in which the rotary actuation means establishes equal phase shifts between the volume displacements in the "N" rotary displacement chambers.

8. The apparatus of claim 7, in which the rotary actuation means is characterized by continuous rotation at the displacement cyclic frequency.

9. The apparatus of claim 8, in which the rotary displacement chambers are provided by a trochoidal displacement mechanism.

10. The apparatus of claim 6, in which the rotary displacement chambers are defined by vanes rotating about an axis in a substantially cylindrical housing.

11. The apparatus of claim 10, in which the cylindrical housing is eccentric to the axis.

12. The apparatus of claim 11, in which the "N" adsorbers are installed in an adsorber rotor, the vanes are carried in slots in the rotor, and the second end of each adsorber communicates to a rotary displacement chamber defined by an adjacent pair of the vanes.

13. The apparatus of claim 5, in which the rotary actuation means is characterized by angular oscillation at the displacement cyclic frequency.

14. The apparatus of claim 13, in which the rotary displacement chambers are defined by vanes rotating about an axis in a circular cylindrical housing which is concentric with the axis.

15. The apparatus of claim 4, in which the displacement cyclic frequency is greater than the PSA cycle frequency by an integer multiple "S">1, and the means to provide fluid communication includes means to sequentially open and close a port to each of the adsorbers in turn during each cycle, so fluid commmunication from the displacement chamber is provided to only one adsorber at a time so as to change the pressure in that adsorber.

16. The apparatus of claim 15, in which "S"="N".

17. The apparatus of claim 15, in which "S"=2.

18. The apparatus of claim 15, in which "S"=3.

19. The apparatus of claim 18, in which the cyclic rotary displacement means is a claw pump.

20. The apparatus of claim 19, in which the location in the flow path is the first end of the adsorber.

21. The apparatus of claim 20, in which the displacement chamber of the claw pump is contracting while the port is open to an adsorber, so as to raise the pressure in that adsorber to the higher pressure.

22. The apparatus of claim 21, with feed supply means to introduce the feed gas mixture to the claw pump apparatus at a feed pressure less than the higher pressure.

23. The apparatus of claim 20, in which the displacement chamber of the claw pump is expanding while the port is open to an adsorber, so as to reduce the pressure in that adsorber to the lower pressure.

24. The apparatus of claim 23, in which the claw pump is a vacuum pump to exhaust gas enriched in the first component from the apparatus.

25. The apparatus of claim 24, with light product delivery means to deliver a light product flow of gas enriched in the second component from the second ends of the adsorbers.

26. The apparatus of claim 15, in which the "N" adsorbers are installed in an adsorber rotor in a housing, and the ports are provided in a sealing face between the rotor and the housing so as to sequentially open and close the ports.

27. The apparatus of claim 4, in which each adsorber is provided as an adsorbent element formed from layered adsorbent sheets, the sheets being the adsorbent material with a reinforcement material, with spacers between the sheets to establish flow channels in a flow direction tangential to the sheets and between adjacent pairs of sheets.

28. The apparatus of claim 4, in which the "N" adsorbers are installed in an adsorber rotor with drive means to rotate the rotor in a housing.

* * * * *